United States Patent [19]

Grugel et al.

[11] Patent Number: 5,420,956
[45] Date of Patent: May 30, 1995

[54] CASE FOR PASSIVE OPTICAL COMPONENTS

[75] Inventors: Peter Grugel; Paul Oehlkers; Susanne Bernhardt; Martin Struss; Dietrich Rund, all of Berlin, Germany

[73] Assignee: KRONE Aktiengesellschaft, Berlin, Germany

[21] Appl. No.: 188,267

[22] Filed: Jan. 28, 1994

[30] Foreign Application Priority Data

Jan. 28, 1993 [DE] Germany .................. 43 02 837.3

[51] Int. Cl.⁶ .............................................. G02B 6/36
[52] U.S. Cl. .................................... 385/135; 385/137
[58] Field of Search ................................ 385/134–137

[56] References Cited

U.S. PATENT DOCUMENTS

| 4,687,289 | 8/1987 | DeSanti | 385/135 |
| 4,840,449 | 6/1989 | Ghandeharizadeh | 385/135 |
| 5,074,635 | 12/1991 | Justice et al. | 385/135 X |
| 5,080,459 | 1/1992 | Wettengel et al. | 385/135 X |
| 5,115,489 | 5/1992 | Norris | 385/135 |
| 5,285,515 | 2/1994 | Milanowski et al. | 385/135 |

FOREIGN PATENT DOCUMENTS

3413401A1 10/1985 Germany .

Primary Examiner—John D. Lee
Attorney, Agent, or Firm—McGlew and Tuttle

[57] ABSTRACT

A case for passive optical components such as glass fibers, couplers and splices permits a reception for couplers and splices while maintaining the common mounting dimensions, and which guarantees a clear, service-friendly and safe guiding of the glass fibers while maintaining the minimum bending radii. At one front side 4 of the lower case portion 2 there are provided strain-relieved individual guide portions 5, 6 for the glass fibers and an S-shaped or diagonal groove 20 integrated in the bottom 10. The receiving portions 12, 13 for couplers 45 and for splices 46 are formed by guide portions 24, 33 connected with the bottom 10. Between the side walls 27, 35 and the receiving portions 12, 13 there are provided fiber guide channels 26, 36 for achieving the required reserve lengths. In the area of the receiving portions 12, 13, transversely to the parallel guiding portion 24 of the couplers 45 and of the splices 46 are included through-passing lift-off openings 30, 38 in the bottom 10.

25 Claims, 5 Drawing Sheets

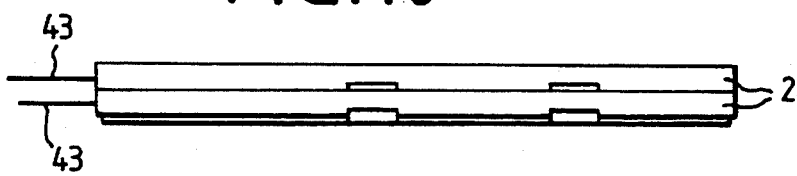
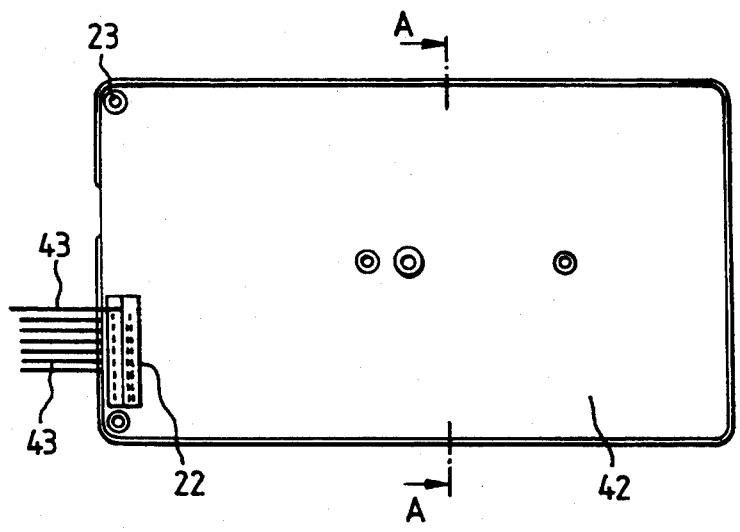
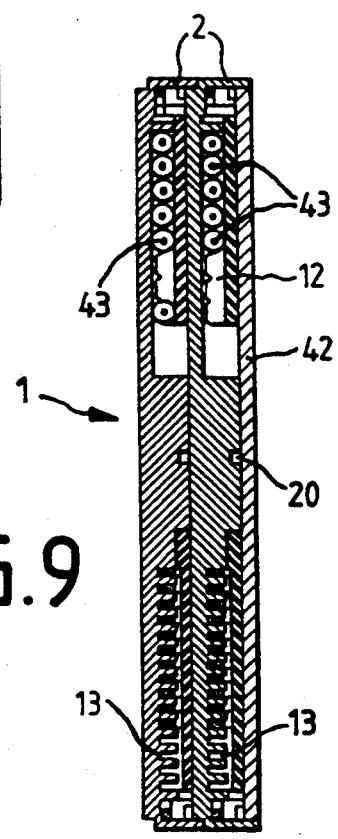

CASE FOR PASSIVE OPTICAL COMPONENTS

FIELD OF THE INVENTION

The present invention relates to a case for passive optical components such as glass fibers, couplers and splices, the case including side walls, a bottom and front surfaces with through-passages, holding-down devices, passages in a bottom section and receiving portions.

BACKGROUND OF THE INVENTION

A receiving portion for the splice connections of light waveguide cables is known in the art from DE 34 13 401 A1. This receiving portion is formed by a box-type, upwardly open, flat case being provided, at one front side close to the side walls, with inlets for the cables and at the open cover side with lug-type holding-down devices projecting inwardly from the side walls. Centrally at the bottom is disposed a support portion carrying a leaf-type holding-down device. Further, a splice holder is attached at the bottom into which the individual splice positions are sequentially laid down. The leaf-type holding-down device covers the section of the splice holder. For stacking the cases, cams are disposed projecting from the case at the corner points and engaging into respective corner portions of the upwardly open case.

It is disadvantageous, in this prior art case, that the glass fibers can only be introduced into the case bundled as light waveguide cables. Strain relief of the individual fibers is unreliable within the bundle. Guiding of the glass fibers in the case is not always guaranteed and is insufficiently secured at the side walls.

SUMMARY AND OBJECTS OF THE INVENTION

It is therefore the object of the invention to develop a case of the type referred to hereinbefore which permits a reception for couplers and splices while maintaining the common mounting dimensions, and which guarantees a clear, service-friendly and safe guiding of the glass fibers while maintaining the minimum bending radii.

According to the invention, a case for passive optical components, such as glass fibers, couplers and splicers is provided. The case includes side walls, a bottom, front surfaces with through-passages, holding-down devices, passages in the bottom and receiving portions. The case includes a front side provided with strain-relieved individual guide portions for receiving glass fibers. An S-shaped groove or diagonal groove is integrated in the bottom of the case. Receiving portions for couplers and for splicers are formed by guide portions connected with the bottom.

The chosen configuration of the receiving portions for couplers and splices in the central section of the lower case portion in conjunction with the comb-type individual entries and exits at the front side of the lower case portion as well as in conjunction with the spatial distribution of the lower case portion permits a variable configuration with different couplers and splices. The disposal of an S-type groove permits the guiding in and out of all glass fibers through the individual exits. By the two-side arrangement of bottom passages at the front sides and the flattening thereof, a glass fiber guiding is possible in different winding directions, corresponding to the respective requirements, while maintaining the minimum bending radii. The dimensions and the structure of the section behind the entries and exits for the glass fibers is of importance for meeting the requirements with respect to the minimum bending radii. The outside case dimensions are selected so that they meet the common mounting conditions and environmental requirements, for instance corresponds the maximum width to the dimensions for the integration in common assembly carriers of the data communication (for instance 19" racks). The entries and exits for the glass fibers are configured such that each glass fiber can individually be guided in and out and strain relieved as well as marked. With this structure there is achieved a higher safety of the strain relief than for a bundle introduction and the strain relief thereof. Strain relief is given by the conical design of the comb-type entries and exits with an introduction slot being slightly wider in the introduction section than the diameter of the glass fiber to be introduced. If the entries and exits are provided as separate components in the front side of the lower case portion, a shape of the slots adapted to the respectively employed glass fibers is possible. By the arrangement of lift-off openings in the bottom section of the lower case portion transversely to the parallely guided receiving portions for the couplers and splices, individual couplers and/or splices can be removed in case of a service job. The arrangement of a surrounding step at the bottom and of a web at the upper side of the lower case portion permit a stacking of lower case portions, wherein the individual lower case portions are fixed and the constructional height is reduced. The cover positively and flushly resting on the lower case portion does not cause an additional constructional height.

A further object of the invention is to provide a case which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 8 is a top view of a lower case portion with cover according to FIG. 1 provided with components;

FIG. 9 is a sectional representation of two stacked lower case portions with cover according to FIG. 8, taken along line A—A of FIG. 8; and FIG. 10 is a side view of two stacked lower case portions according to FIG. 8.

DETAILED DESCRIPTION OF THE PREFERRED EMBODIMENT

Figure 6:
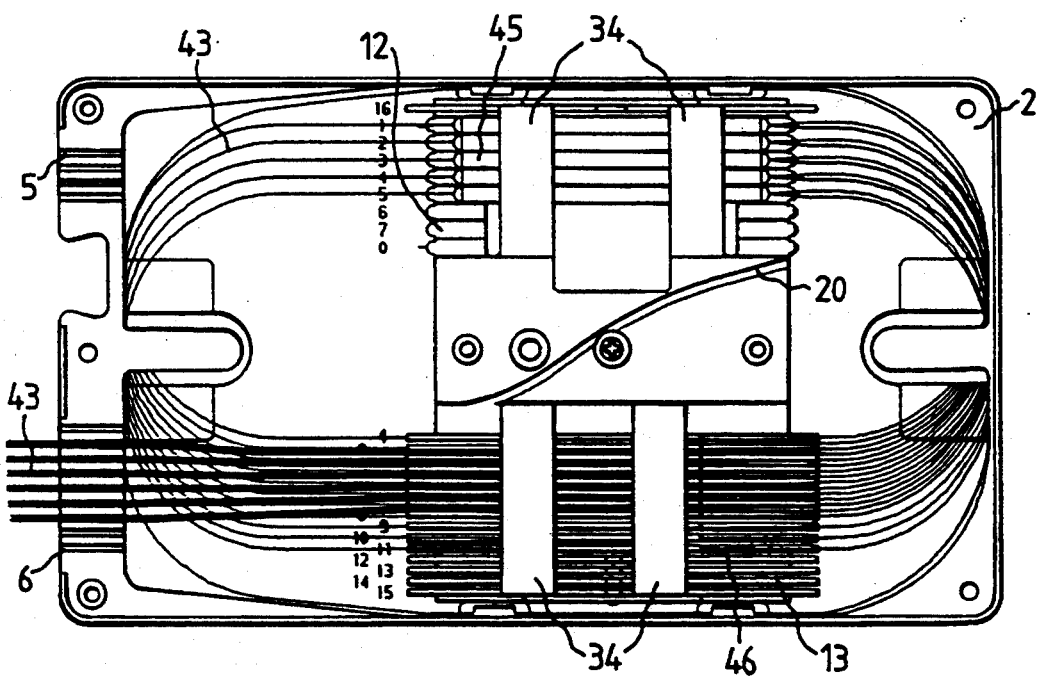
FIG. 6 is a top view of a lower case portion according to FIG. 1 provided with components.
Figure 7:
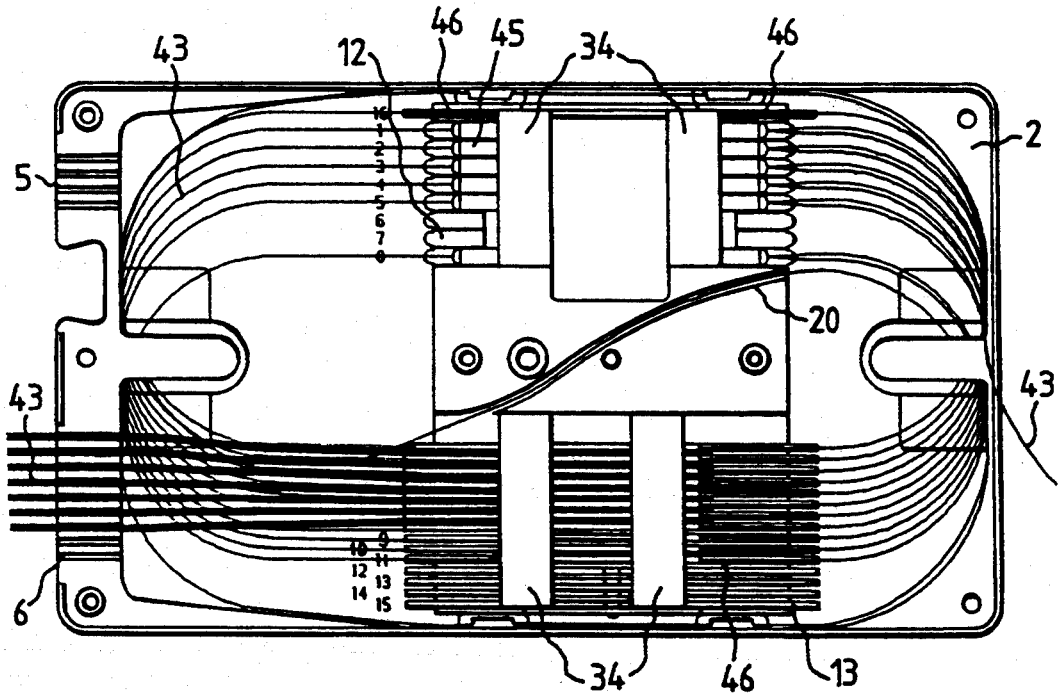
FIG. 7 is a top view of another lower case portion according to FIG. 1 provided with components.

The case 1 for receiving passive optical components, such as glass fibers, couplers and splices, comprises a lower case portion 2 (FIGS. 1 and 2) and a cover 42 not shown in more detail (FIGS. 8 and 9). The case 1 serves for protection of the connection positions (splice positions) and of the branches (coupler positions) of glass fiber cables and for reception of the required reserve lengths of glass fibers in conjunction with such positions. The case 1 has a modular design. Depending on the actual requirements, a different number of lower case portions 2 can be stacked on each other. The glass fibers 43 connecting the lower case portions 2 are each introduced through the case bottoms 10 (FIG. 7). The lower case portion 2 is provided with integrated receiving portions 12, 13 for the couplers 45 and splices 46 (FIGS. 6, 7), in particular sandwich splices. A variable configuration of the cases 1 with couplers 45 and splices 46 is possible (FIGS. 6, 7). During final assembly, the lower case portion 2 or several lower case portions 2 are screwed together with the cover 42 to form a case 1 or a case unit (FIGS. 8 to 10).

Figure 1:
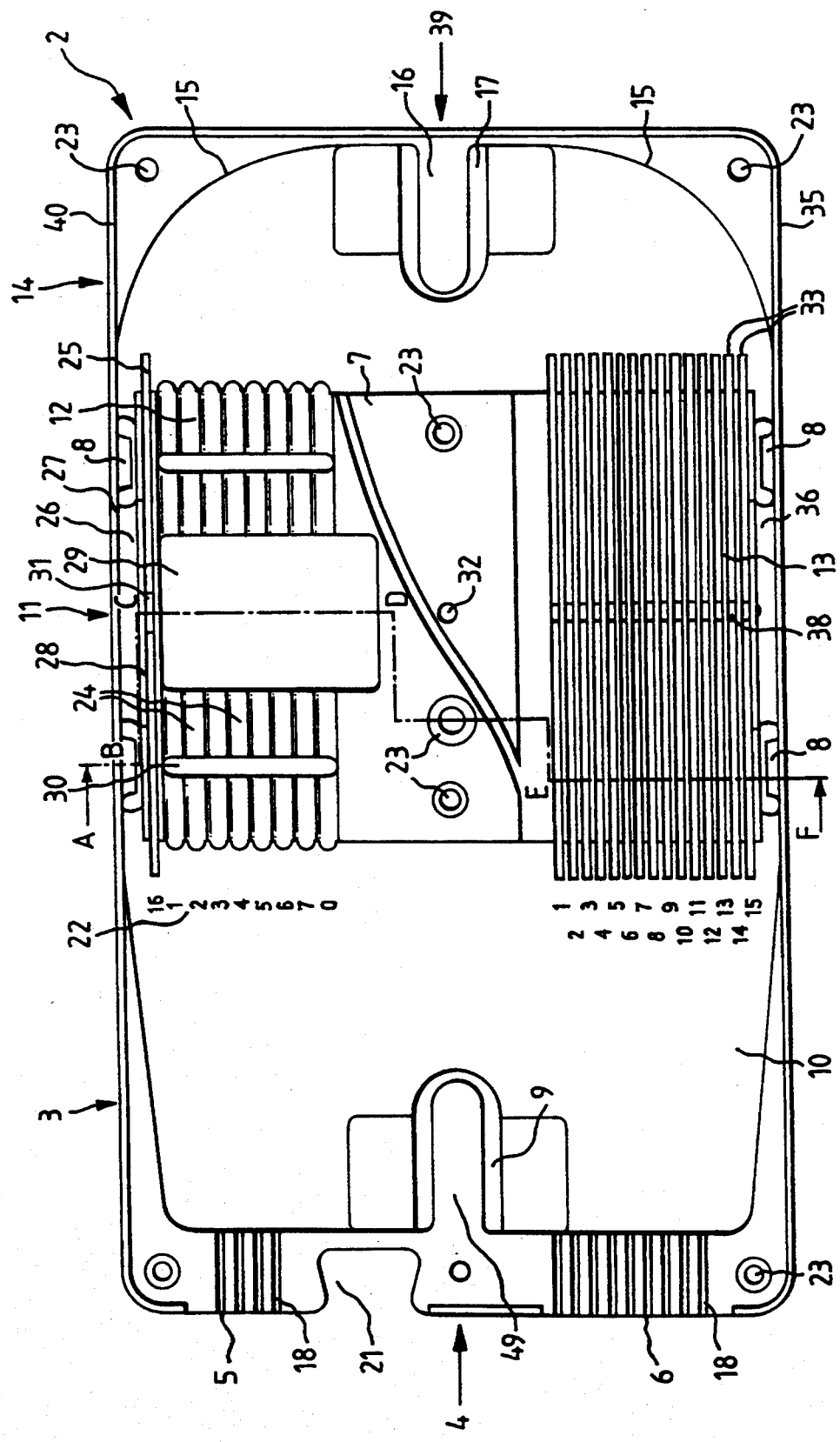
FIG. 1 is a top view of the lower case portion.

In FIG. 1 there is shown the top view of the lower case portion 2. The lower case portion 2 includes a front entry section 3 with individual entries and exits 5, 6 for the glass fibers integrated at the front side 4 and with a holding-down device 49 above a bottom passage 9 of the lower case portion 2, a central section 11 with receiving portions 12, 13 for the couplers 45 and the splices 46 and with a support portion 7, and a rear section 14 with curved wall portions 15 for guiding the glass fibers and with a holding-down device 16 being disposed above a bottom passage 17 of the lower case portion 2.

Figure 3:
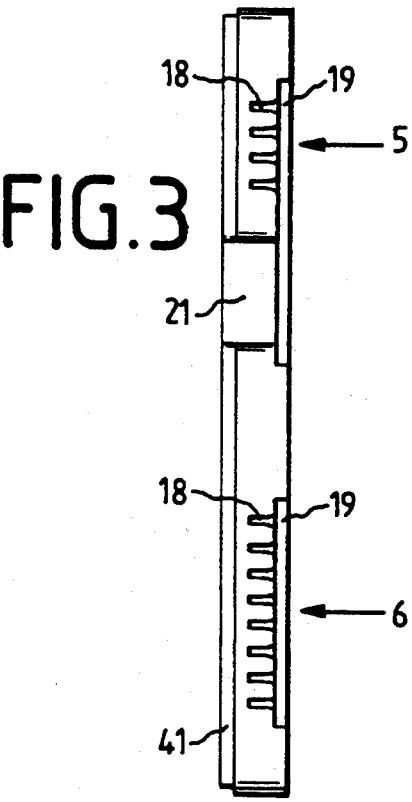
FIG. 3 is a side view of the lower case portion in the entry section.

The individual entries 5 for the glass fibers consist, according to the representation of FIG. 3, of four introduction slots 18 with inclined introduction portions 19 in a conical design of 5°. The upper width of the introduction slot is slightly larger than the diameter of the glass fibers to be introduced, so that the glass fibers are inserted strain-relieved over their coatings. The elasticity of the glass fiber coating effects a reliable clamping action. The individual entries 5 are integrated in the front side 4 of the lower case portion 2. They can however also be separate components and mounted in the front side 4. In the same way, the individual exits 6 are constructed for eight glass fibers. The individual exits 6 are also used for the introduction of glass fibers, in conjunction with the S-shaped or diagonal groove 20. If the glass fibers are introduced through the individual exits 6, the introduced glass fiber has to be brought by the S-shaped groove 20 into the same winding direction as the glass fibers to be guided out. The guided in an out glass fibers are then guided out through the individual exits 6.

Figure 2:
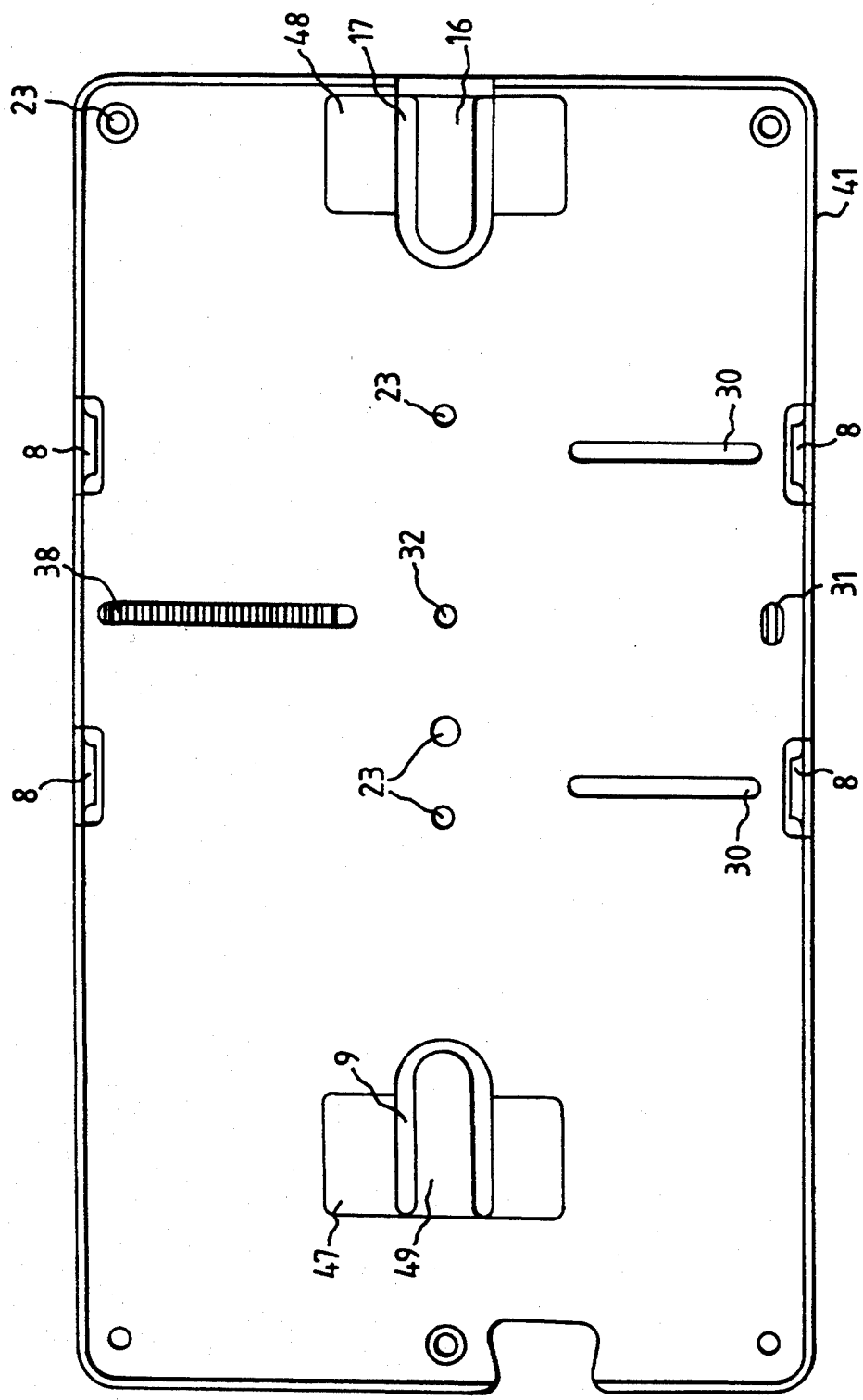
FIG. 2 is a bottom view of the bottom of the lower case portion.

The bottom passages 9 and 17 of the lower case portion 2 are flattened from above and below at the opposite sides, and are thus adapted for an optimum guiding of the glass fibers. For this purpose a trapezoidal guide portion 21 formed in the front side 4 also serves for receiving and guiding the glass fibers and the recesses 47, 48 on the lower side of the bottom 10 (FIG. 2).

In the entry section 3 of the lower case portion 2, before the receiving portions 12, 13, there are provided markings 22 for the couplers 45 and the splices 46.

Figure 4:
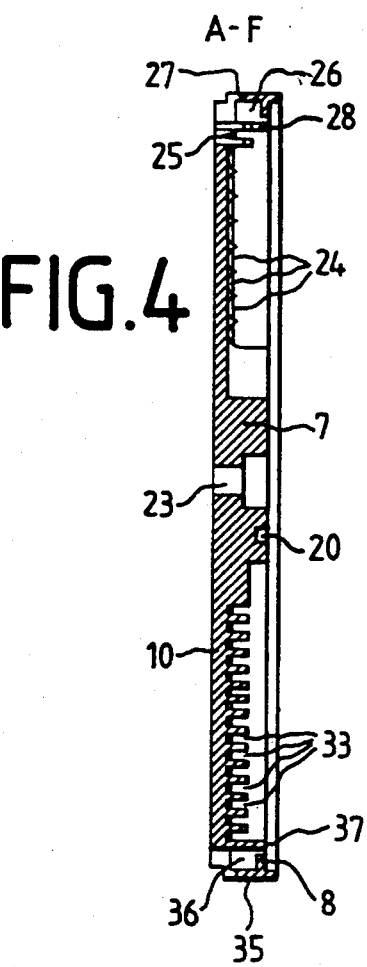
FIG. 4 is a sectional representation along line A–F of the lower case portion.

FIG. 4 shows, in a diagrammatical representation, the construction of the central section 11. The central section 11 includes, in the center, the support portion 7 with an S-shaped groove 20 and boreholes 23, 32 (FIG. 1) for securing the case 1 in the modular design, for fixing the cover and for fixing to a not shown assembly carrier or for adapting the case 1 to the installation environment. The S-shaped groove 20 permits a change of direction for the entry fiber and thus a placing together of the glass fibers for the entries and exits in a common slot section, for instance according to FIG. 7 in the area of the individual exits 6. The support portion 7 is integrated in the bottom 10 of the lower case portion 2. Subsequently to the support portion 7 there are formed eight guide grooves 24 representing the receiving portion 12 for eight couplers 45. Then there follows a guide portion 25 for a splice 46 and a fiber guide channel 26 being limited by the one side wall 27 and a limiting web 28 and being covered by two holding-down devices 8. The guide grooves 24 are interrupted by a surface 29 disposed transversely to the groove configuration, the surface serving for applying adhesive material. The couplers 45 are safely fixed in the grooves 24 by means of an adhesive film. Also transversely to the configuration of the grooves 24 there are disposed, in the bottom 10 of the lower case portion 2, through-passing lift-off openings 30 above all grooves 24 in both groove sections, by means of which an easy disassembly of individual couplers 45 is possible. The guide portion 25 also comprises, for an easier removal of the splice 46 mounted therein, a lift-off opening 31 in the bottom 10 of the lower case portion 2.

To the other side of the support portion 7 follow fifteen guide grooves 33 forming the receiving portion 13 for fifteen splices 46. Between the last guide groove 33 for the 15th splice 46 and the side wall 35 of the lower case portion 2 again a fiber guide channel 36 is disposed, being limited by a limiting web 37 (FIG. 4) of the receiving portion 13 for the splices 46 and being covered by the two holding-down devices 8. Transversely to the direction of the guide grooves 33 there is provided a lift-off opening 38 for removing individual splices 46 from the grooves 33. In a not shown embodiment, a central supply channel for the glass fibers can be provided in the center of the receiving portions 13 for the splices 46. In this case, two lift-off openings 38 are to be provided, which are separated from each other by the supply channel. The supply channel serves for guiding the fiber to the exit 6 while observing the minimum bending radius.

According to the representation in FIG. 1, the rear section 14 is limited by the curved wall portions 15 for guiding the fiber out and into the receiving portions 12, 13. At the front side 39 is formed the holding-down device 16 above the bottom passage 17. The bottom passage 17 is formed in the same way as the bottom passage 9 in the entry section 3. The bottom passage 17 of the rear section 14 serves for guiding out or in, resp., glass fibers from another lower case portion (FIG. 7).

According to the representations in FIGS. 1 and 2, the lower case portion 2 is provided at its upper side with a surrounding web 40 and at its lower side with a surrounding step 41 of identical dimensions, which engage into each other when stacking lower case portions and guarantee thus a reliable fixation of the lower case portions 2 as well as a reduction in constructional height (FIGS. 9, 10).

In FIGS. 6 and 7 there are shown, in top views with couplers 45 and splices 46, lower case portions 2 provided with components, the lower case portions being stacked on each other, according to the sectional representation in FIG. 9, and being completed by the cover 42 to form a coupler unit. FIG. 8 shows the top view of such a coupler unit. In FIG. 7 there is shown the lower-side lower case portion 2 of the coupler unit according to FIG. 10. In the shown case, a glass fiber is introduced through the upper introduction slot 18 of the individual exits 6 into the lower portion 2 and is guided by the S-shaped groove 20 such that the winding direction changes and can also be guided out after the splice process through the individual exits 6. Thereby, the glass fibers can be guided on from the coupler case in a tight arrangement. As is shown in FIG. 7, a glass fiber can be guided out from the bottom passage 17 and into the above lower case portion 2 according to FIG. 6, and can be further spliced therein. In the area of the splices 46, the glass fibers are fixed by means of the holding-down devices 34. The holding-down devices 34 are formed of adhesive strips acting on the secondary envelopes of the glass fibers placed between the splices 46 and guided parallely, and pressing them into the splices 46. The thickness of the adhesive strips is selected such that the space between the glass fibers and a mounted cover 42 or another lower case portion 2 is filled up. With temperature changes, the glass fibers can extend into the section following the splice section, while maintaining the minimum bending radii (pistoning effect).

Figure 5:
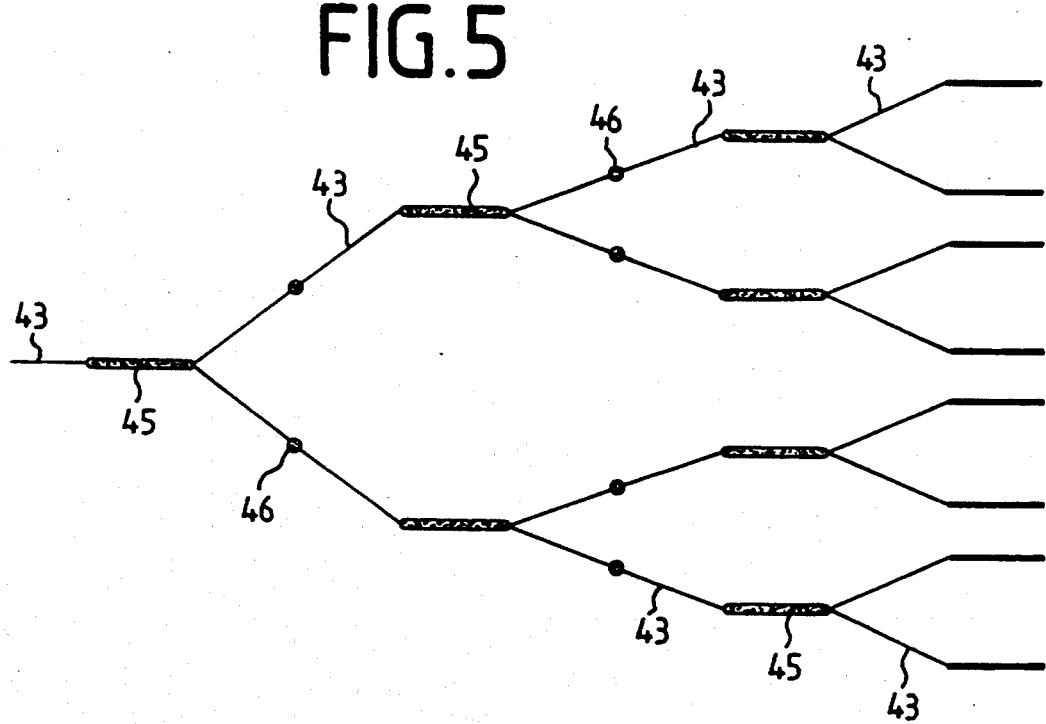
FIG. 5 is a diagrammatical representation of a coupler cascade 1×8.

In FIG. 5 there is shown, as an example, the construction of a coupler cascade 1×8 for integration in the case 1. A fiber 43 is transformed into eight fibers 43. For this purpose, the glass fiber 43 is branched into two fibers 43 in a first coupler 45. These two fibers 43 are guided over one splice each 46 again into one coupler 45 each, and are branched therein into another two fibers 43 each, so that at this position, over the three couplers 45 and the two splices 46, four fibers 43 have already been branched. These four fibers 43 are branched over four further splices 46 and four further couplers 45 into in total eight fibers 43. Depending on the actual requirements, coupler units of 1×32 and larger can be achieved. For this construction, in total four lower case portions 2 are stacked.

While a specific embodiment of the invention has been shown and described in detail to illustrate the application of the principles of the invention, it will be understood that the invention may be embodied otherwise without departing from such principles.

What is claimed is:

1. A case for passive optical components such as glass fibers, couplers and splices, the case comprising:
   a first side wall, a second side wall, a front side wall and a back side wall;
   a bottom;
   holding-down devices connected to said bottom;
   passages through said bottom;
   strain-relieved individual guide portions, for glass fibers, provided at an opening of said front side wall;
   an S-shaped groove formed in said bottom; and
   a first receiving portion for couplers and splices adjacent to said first side wall, and a second receiving portion for couplers and splices adjacent to a said second side wall, each of said first receiving portion and said second receiving portion being formed by guide portions connected with said bottom, each guide portion for receiving and guiding one of a single coupler or a single splice, said first receiving portion being provided on one side of said S-shaped groove and said second receiving portion being provided on another side of said S-shaped groove.

2. A case according to claim 1, wherein:
a fiber guide channel is provided between said first receiving portion and said first side wall and a fiber guide channel is provided between said second receiving portion and said second side wall, lift-off openings being provided in said bottom, adjacent to said receiving portions.

3. A case according to claim 2, wherein:
said first receiving portion received individual couplers and at least one additional guide portion, for an additional splice, is disposed between said first receiving portion and said fiber guide channel.

4. A case according to claim 3, wherein:
a lift-off opening is disposed at a bottom section of said additional guide portion.

5. A case according to claim 2, wherein:
said fiber guide channel is covered by a holding-down device formed in said side walls.

6. A case according to claim 1, wherein:
said individual guide portions define individual entries and individual exits having introduction slots of conical shape whereby an upper width of each introduction slot is slightly larger than a diameter of the glass fiber to be guided in and out of one of said introduction slots.

7. A case according to claim 6, wherein:
said conicity of said introduction slots is from 4° to 7°.

8. A case according to claim 1, wherein:
said individual guide portions form individual entries and exits, said guide portions being formed in said front side.

9. A case according to claim 1, wherein:
said individual guide portions define individual entries and exits formed by separate components mounted on said front side.

10. A case according to claim 1, wherein:
said guide portions are interrupted by a surface in an area of said receiving portion for said couplers.

11. A case according to claim 1, wherein:
said bottom section of said receiving portions are provided with markings for said guide portions.

12. A case according to claim 1, wherein:
said bottom passages comprise opposed recesses for guiding fibers in and out of the case.

13. A case according to claim 1, wherein:
said bottom has a lower side with a surrounding step.

14. A case according to claim 1, wherein:
each of said front side wall, back side wall, first side wall and second side wall have an upper side forming a case surrounding web.

15. A case according to claim 1, wherein:
said side walls, bottom and front surfaces form a lower case portion with an upper edge, a cover being provided positively and flushly terminating with said upper edge of said lower case portion.

16. A case according to claim 15, wherein:
said lower case portion is stackable on another lower case portion.

17. A case according to claim 1, further comprising:
coupler/splice holding-down devices provided above the couplers and the splices.

18. A case according to claim 17, wherein:

said coupler/splice holding-down devices rest on an outer envelope of the glass fibers parallely guided between splices whereby a longitudinal extension between a primary and secondary envelope of the glass fibers is possible.

19. A case according to claim 1, wherein:
said receiving portion for splices is provided with a central guide channel for guiding glass fibers to said individual guide portions.

20. A case according to claim 1, wherein:
said bottom has a lower side with a support portion provided with a bore hole for screwing the case to another case in a modular design.

21. A case according to claim 1, wherein:
said first receiving portion is for receiving couplers and said receiving portion is for receiving splices.

22. A case according to claim 1, wherein:
said S-shaped groove is provided in a region between said first receiving portion and said second receiving portion, said region being free of individual guide channels.

23. A case for passive optical components such as glass fibers, couplers and splices, the case comprising:
a first side wall, a second side wall, a front side wall and a back side wall; a bottom;
holding-down devices connected to said bottom;
passages through said bottom;
with strain-relieved individual guide portions, for glass fibers, provided at an opening in said front side wall;
diagonal groove means for receiving one or a plurality of glass fibers for changing a direction of curvature of glass fibers, said diagonal groove means being formed in said bottom;
a coupler receiving portion disposed adjacent to said first side wall, said coupler receiving portion being formed by coupler guide portions formed in said bottom, each of said coupler guide portions for receiving and guiding a single coupler; and
a splice receiving portion disposed adjacent to said second side wall, formed by splice guide portions formed in said bottom, each of said splice guide portions for receiving and guiding a single splice connection, said coupler receiving portion being disposed between said first side wall and said diagonal groove means and said splice receiving portion being disposed between said second side wall and said diagonal groove means formed by guide portions connected with said bottom.

24. A case according to claim 23, wherein:
a fiber guide channel is provided between said coupler receiving portion and said first side wall and a fiber guide channel is provided between said splice receiving portion and said second side wall, lift-off openings being provided in said bottom, in a region of said coupler receiving portion and lift-off openings being provided in said bottom in a region of said splice receiving portions.

25. A case according to claim 23, wherein:
said diagonal groove means is provided in a region between said coupler receiving portion and said splice receiving portion, said region being free of individual guide portions.

* * * * *